(12) United States Patent
Kawano et al.

(10) Patent No.: US 8,009,177 B2
(45) Date of Patent: Aug. 30, 2011

(54) USER INTERFACES FOR MANAGING IMAGE COLORS

(75) Inventors: Mark Kawano, Burlingame, CA (US); Jean-Pierre Mouilleseaux, Venice, CA (US); Mike Stern, San Francisco, CA (US); Daniel Pettigrew, Pacific Palisades, CA (US); Dan Candela, Beverly Hills, CA (US)

(73) Assignee: Apple Inc., Cupertino, CA (US)

( * ) Notice: Subject to any disclaimer, the term of this patent is extended or adjusted under 35 U.S.C. 154(b) by 833 days.

(21) Appl. No.: 12/029,408

(22) Filed: Feb. 11, 2008

(65) Prior Publication Data

US 2009/0204913 A1    Aug. 13, 2009

(51) Int. Cl.
G09G 5/00 (2006.01)
G09G 5/02 (2006.01)
H04N 5/202 (2006.01)
H04N 11/00 (2006.01)
G06K 9/00 (2006.01)
G06K 9/40 (2006.01)
G06F 3/048 (2006.01)

(52) U.S. Cl. ........ 345/593; 345/428; 345/589; 345/619; 345/156; 348/254; 348/498; 348/557; 382/162; 382/167; 382/254; 382/274; 715/764; 715/810; 715/833; 715/840

(58) Field of Classification Search .................. 345/426, 345/428, 581, 589, 593, 597, 617–619, 156–168; 348/182, 196, 254, 256, 496, 498, 557, 630, 348/577–578; 382/162–167, 254, 276; 715/762–764, 810, 833, 835, 840, 856, 860
See application file for complete search history.

(56) References Cited

U.S. PATENT DOCUMENTS

| | | | | |
|---|---|---|---|---|
| 5,416,890 | A * | 5/1995 | Beretta | 345/590 |
| 7,502,033 | B1 * | 3/2009 | Axelrod | 345/593 |
| 7,598,964 | B2 * | 10/2009 | Olson | 345/594 |
| 2005/0039142 | A1 * | 2/2005 | Jalon et al. | 715/823 |
| 2006/0158881 | A1 * | 7/2006 | Dowling | 362/231 |
| 2007/0200867 | A1 * | 8/2007 | Reynolds et al. | 345/589 |
| 2009/0183122 | A1 * | 7/2009 | Webb et al. | 715/840 |

* cited by examiner

Primary Examiner — Wesner Sajous
(74) Attorney, Agent, or Firm — Fish & Richardson P.C.

(57) ABSTRACT

A computer-implemented method includes displaying multiple color bins in a user interface, each color bin representing a segment of a color spectrum, each color bin having a representative color that resides in the associated color spectrum segment, wherein each color bin is selectable such that selecting a color bin enables varying colors in a content item corresponding to the color bin's associated segment, displaying in the user interface, a first user interface control configured to vary colors in the content item based on the selected color bin, and in response to input, displaying a plurality of user interface controls in the user interface, each user interface control associated with a segment of the color spectrum, each user interface control configured to vary colors in the content item corresponding to an associated color spectrum segment.

45 Claims, 8 Drawing Sheets

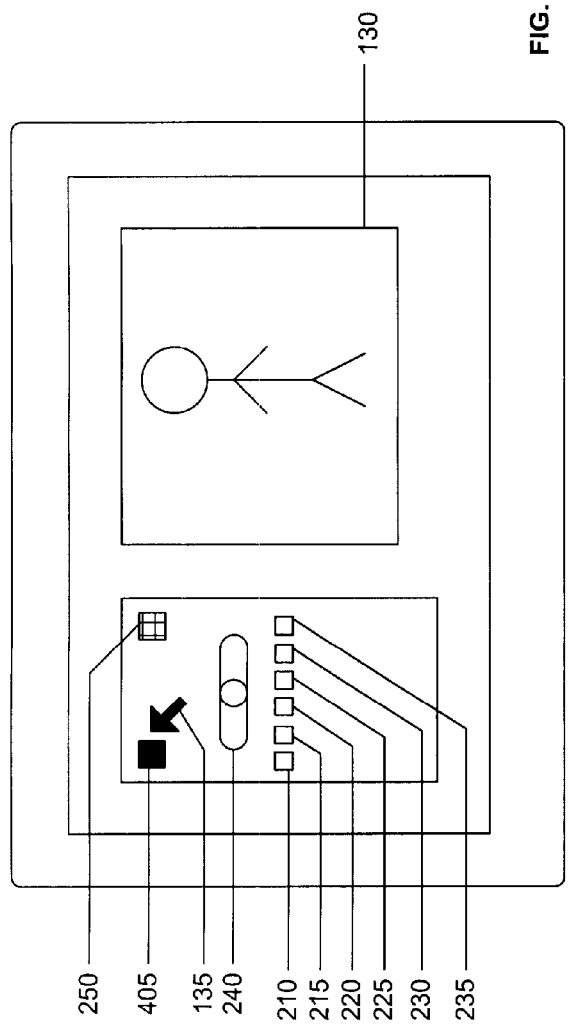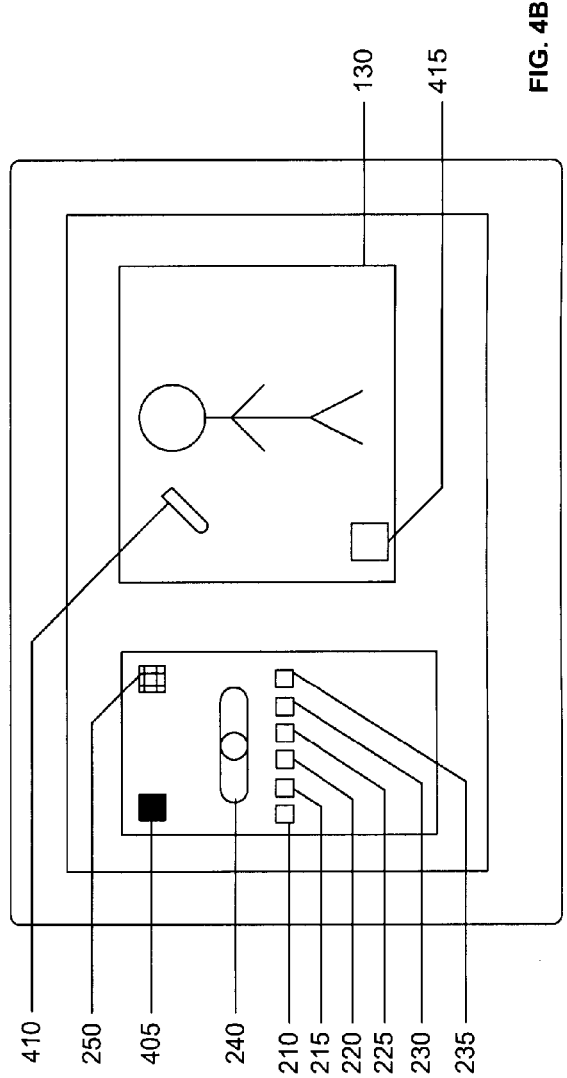

USER INTERFACES FOR MANAGING IMAGE COLORS

TECHNICAL FIELD

The present disclosure relates to managing aspects of user interfaces, for example, image colors, in software applications.

BACKGROUND

Software applications can edit content items such as images, video, audio, documents, and the like. Content items, such as images, can be captured using devices such as digital cameras, stored as images files, e.g., in JPG format, and transferred to storage devices. A software application can retrieve the image files stored in a storage device and display the images on a display device of a computer system. The images can have attributes, e.g., hue, saturation, luminance, and the like, which can be changed using user interface controls, provided by the software application.

SUMMARY

This specification describes technologies relating to user interfaces for managing image colors. In one example, a software application displays a color image in a user interface. The user interface includes one or more user interface controls that are configured to enable controlling color-based attributes of the image, e.g., hue, saturation, luminance, and the like. A compact view of the user interface includes multiple selectable objects representing segments of the color spectrum and a group of user interface controls common to all the segments. Selecting one of the objects enables manipulating the colors in the image based on the colors included in the corresponding segment using the group of user interface controls. An expanded view of the user interface includes multiple objects representing segments of the color spectrum and a group of user interface controls for each object. In the expanded view, the user can manipulate the colors in the image based on the colors included in the corresponding spectrum using the group of user interface controls corresponding to the object. Further, the user interface includes controls that enable users to select a specific hue in the image and manipulate color attributes of the image based on the selected hue. In addition, the display of user interface controls is changed depending on the color attribute of the image that is being manipulated.

In one aspect, a computer-implemented method is described. The method includes displaying a plurality of color bins in a user interface, each color bin representing a segment of a color spectrum, each color bin having a representative color that resides in the associated color spectrum segment, wherein each color bin is selectable such that selecting a color bin enables varying colors in a content item corresponding to the color bin's associated segment, displaying in the user interface, a first user interface control configured to vary colors in the content item based on the selected color bin, and in response to input, displaying a plurality of user interface controls in the user interface, each user interface control associated with a segment of the color spectrum, each user interface control configured to vary colors in the content item corresponding to an associated color spectrum segment.

This, and other aspects, can include one or more of the following features. The method can further include hiding the first user interface control and the plurality of color bins from display, in response to the input. The method can further include displaying an input object in the user interface, the input object configured to receive the input. The method can further include displaying the content item in the user interface. Varying color in the content item can cause the content item to be displayed according to the varied color. The first user interface control can include a slider including a button located at a changeable position within the slider, wherein the position of the button within the slider corresponds to a color attribute in the content item. The method can further include, in response to receiving input hiding the plurality of user interface controls from display, displaying the first user interface control, and displaying the plurality of color bins. A user interface control of the plurality of user interface controls can include one or more of a hue control, a saturation control, and a luminance control.

In another aspect, a computer program product, tangibly stored on a computer-readable medium, operable to cause data processing apparatus to perform operations is described. The operations include displaying a plurality of color bins in a user interface, each color bin representing a segment of a color spectrum, each color bin having a representative color that resides in the associated color spectrum segment, wherein each color bin is selectable such that selecting a color bin enables varying colors in a content item corresponding to the color bin's associated segment, displaying in the user interface, a first user interface control configured to vary colors in the content item based on the selected control bin, and in response to input, displaying a plurality of user interface controls in the user interface, each user interface control associated with a segment of the color spectrum, each user interface control configured to vary colors in the content item corresponding to an associated color spectrum segment.

This, and other aspects, can include one or more of the following features. The operations can further include hiding the first user interface control and the plurality of color bins from display, in response to the input. The first user interface control can include a slider including a button located at a changeable position within the slider, wherein the position of the button within the slider corresponds to a color attribute in the content item. The operations further include, in response to receiving input, hiding the plurality of user interface controls from display, displaying the first user interface control, and displaying the plurality of color bins. A user interface control of the plurality of user interface controls can include one or more of a hue control, a saturation control, and a luminance control.

In another aspect, a system including a processor, and a computer-readable medium including instructions to cause the processor to perform operations is described. The operations include displaying a plurality of color bins in a user interface, each color bin representing a segment of a color spectrum, each color bin having a representative color that resides in the associated color spectrum segment, wherein each color bin is selectable such that selecting a color bin enables varying colors in a content item corresponding to the color bin's associated segment, displaying in the user interface, a first user interface control configured to vary colors in the content item based on the selected control bin, and in response to input, displaying a plurality of user interface controls in the user interface, each user interface control associated with a segment of the color spectrum, each user interface control configured to vary colors in the content item corresponding to an associated color spectrum segment.

This, and other aspects, can include one or more of the following features. The operations can further include hiding the first user interface control and the plurality of color bins from display, in response to the input. The first user interface control can include a slider including a button located at a changeable position within the slider, wherein the position of the button within the slider corresponds to a color attribute in the content item. The operations further include, in response to receiving input, hiding the plurality of user interface controls from display, displaying the first user interface control, and displaying the plurality of color bins. A user interface control of the plurality of user interface controls can include one or more of a hue control, a saturation control, and a luminance control.

In another aspect, a computer-implemented method is described. The method includes displaying a content item in a display device according to one or more color attributes including a color from a color spectrum, displaying a color bin in the display device, the color bin related to a segment of the color spectrum, the color bin displayed in a color corresponding to a representative color of the segment, wherein selecting the color bin enables changing color of the content item based on the segment, and, in response to receiving input, changing a hue of the representative color to a different hue, and displaying the color bin in a different color corresponding to the different hue.

This, and other aspects, can include one or more of the following features. Receiving the input can include detecting a selection of an input object displayed in the display device, the input object configured to facilitate changing the hue of the representative color to the different hue, wherein, when the input object is selected, positioning a cursor over a location in the content item causes a hue of the location to be displayed in the display device, and receiving a selection of a location in the content item. When the color bin is displayed in the representative color, changing the color of the content item can cause more change in color in portions of the content item displayed according to the representative color in comparison to change in color in portions of the content item displayed in colors other than the representative color. The segment can include a plurality of color values, and the representative color can represent a color value at a location in the segment. The method can further include displaying a plurality of color bins representing a plurality of segments of the color spectrum in a plurality of colors in the display device, each color bin representing a corresponding segment of the color spectrum. The plurality of segments can represent equal divisions of the color spectrum. The content item can be an image displayed in the display device according to a changeable default color. The color bin can be selected using a cursor displayed in the display device, the cursor operated by a pointing device operatively coupled to the display device.

In another aspect, a computer program product, tangibly stored on a computer-readable medium, operable to cause data processing apparatus to perform operations is described. The operations include displaying a content item in a display device according to one or more color attributes including a color from a color spectrum, displaying a color bin in the display device, the color bin related to a segment of the color spectrum, the color bin displayed in a color corresponding to a representative color of the segment, wherein selecting the color bin enables changing color of the content item based on the segment, and, in response to receiving input, changing a hue of the representative color to a different hue, and displaying the color bin in a different color corresponding to the different hue.

This, and other aspects, can include one or more of the following features. Receiving the input can include detecting a selection of an input object displayed in the display device, the input object configured to facilitate changing the hue of the representative color to the different hue, wherein, when the input object is selected, positioning a cursor over a location in the content item causes a hue of the location to be displayed in the display device, and receiving a selection of a location in the content item. When the color bin is displayed in the representative color, changing the color of the content item can cause more change in color in portions of the content item displayed according to the representative color in comparison to change in color in portions of the content item displayed in colors other than the representative color. The segment can include a plurality of color values, and the representative color can represent a color value at a location in the segment. The operations can further include displaying a plurality of color bins representing a plurality of segments of the color spectrum in a plurality of colors in the display device, each color bin representing a corresponding segment of the color spectrum. The plurality of segments can represent equal divisions of the color spectrum. The content item can be an image displayed in the display device according to a changeable default color. The color bin can be selected using a cursor displayed in the display device, the cursor operated by a pointing device operatively coupled to the display device.

In another aspect, a system including a processor, and a computer-readable medium including instructions to cause the processor to perform operations is described. The operations include displaying a content item in a display device according to one or more color attributes including a color from a color spectrum, displaying a color bin in the display device, the color bin related to a segment of the color spectrum, the color bin displayed in a color corresponding to a representative color of the segment, wherein selecting the color bin enables changing color of the content item based on the segment, and, in response to receiving input, changing a hue of the representative color to a different hue, and displaying the color bin in a different color corresponding to the different hue.

This, and other aspects, can include one or more of the following features Receiving the input can include detecting a selection of an input object displayed in the display device, the input object configured to facilitate changing the hue of the representative color to the different hue, wherein, when the input object is selected, positioning a cursor over a location in the content item causes a hue of the location to be displayed in the display device, and receiving a selection of a location in the content item. When the color bin is displayed in the representative color, changing the color of the content item can cause more change in color in portions of the content item displayed according to the representative color in comparison to change in color in portions of the content item displayed in colors other than the representative color. The segment can include a plurality of color values, and the representative color can represent a color value at a location in the segment. The operations can further include displaying a plurality of color bins representing a plurality of segments of the color spectrum in a plurality of colors in the display device, each color bin representing a corresponding segment of the color spectrum. The plurality of segments can represent equal divisions of the color spectrum. The content item can be an image displayed in the display device according to a changeable default color. The color bin can be selected using a cursor displayed in the display device, the cursor operated by a pointing device operatively coupled to the display device.

Particular implementations of the subject matter described in this specification can be implemented to realize one or more of the following potential advantages. A compact view and an expanded view of a control panel including user interface controls to control color-attributes of an image can be presented to the user. The compact view can decrease clutter in the user interface because it decreases the number of controls displayed. The expanded view can reduce the number of selections that a user needs to make to change color-attributes of the image. Enabling the user to select representative hues of a color segment offers the user better control over the colors of the image that the user wishes to manipulate. The user interface controls can be displayed according to the colors of the color segments enhancing user experience as well providing information about the specific colors that the user is manipulating.

The details of one or more implementations are set forth in the accompanying drawings and the description below. Other features, aspects, and advantages will become apparent from the description, the drawings, and the claims.

BRIEF DESCRIPTION OF THE DRAWINGS

FIGS. 4A and 4B are schematics of examples of a user interface in a display device.

Like reference numbers and designations in the various drawings indicate like elements.

DETAILED DESCRIPTION

Figure 1:
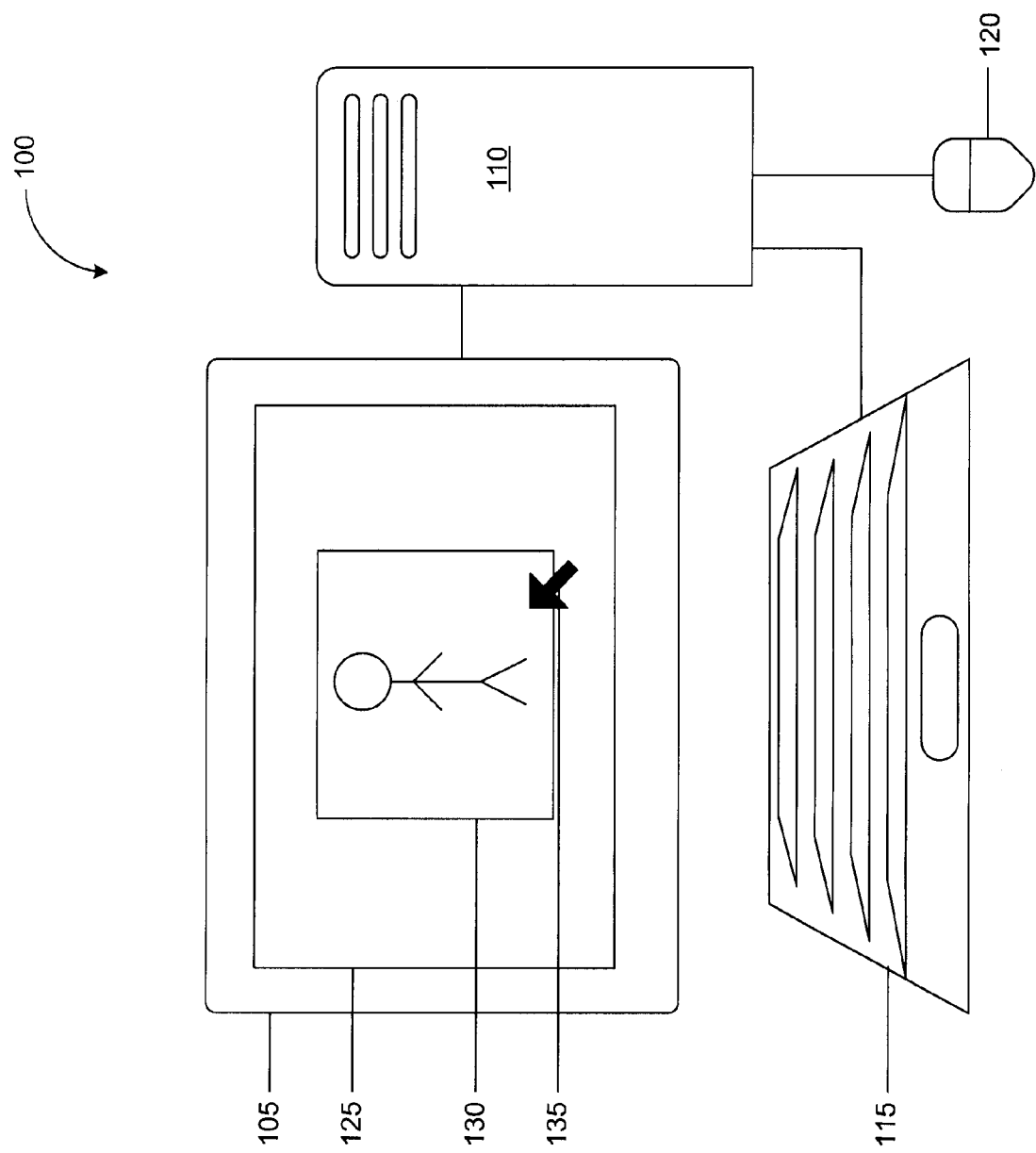
FIG. 1 is a schematic of an example of a system for editing images.

FIG. 1 depicts a schematic of an example of a system 100 for editing content. The system 100 can be any computer system such as a desktop computer, laptop computer, personal digital assistant (PDA), and the like. The system 100 includes a display device 105 operatively coupled to a processing unit 110. In addition, the system 100 includes input devices, such as a keyboard 115 and a pointing device 120, e.g., a mouse, a stylus, and the like, operatively coupled to the processing unit 110. A user can provide input using the keyboard 115 and the pointing device 120, and can view the outcome of the input on the display device 105.

In some implementations, the processing unit 110 is configured to receive a computer program product, e.g., a CD-ROM, tangibly embodied in a computer-readable medium, including instructions to perform operations. For example, the processing unit 115 can include a CD-ROM drive to receive the computer program product, e.g., a CD. The CD can be an installation disk that includes instructions corresponding to a software application that enables editing and management of content, e.g., images, video, audio, documents, and the like. The instructions in the computer program product cause the processing unit 110 to provide a user with a user interface 125 that allows the user to edit and manage content, e.g., images. In some implementations, the images are stored in storage media, e.g., a hard disk, operatively coupled to the processing unit 110. To enable a user to edit and manage images using the input devices 115 and 120, the user interface 125 is displayed on the display device 105 and an image 130 is displayed in the user interface 125.

Figure 2:
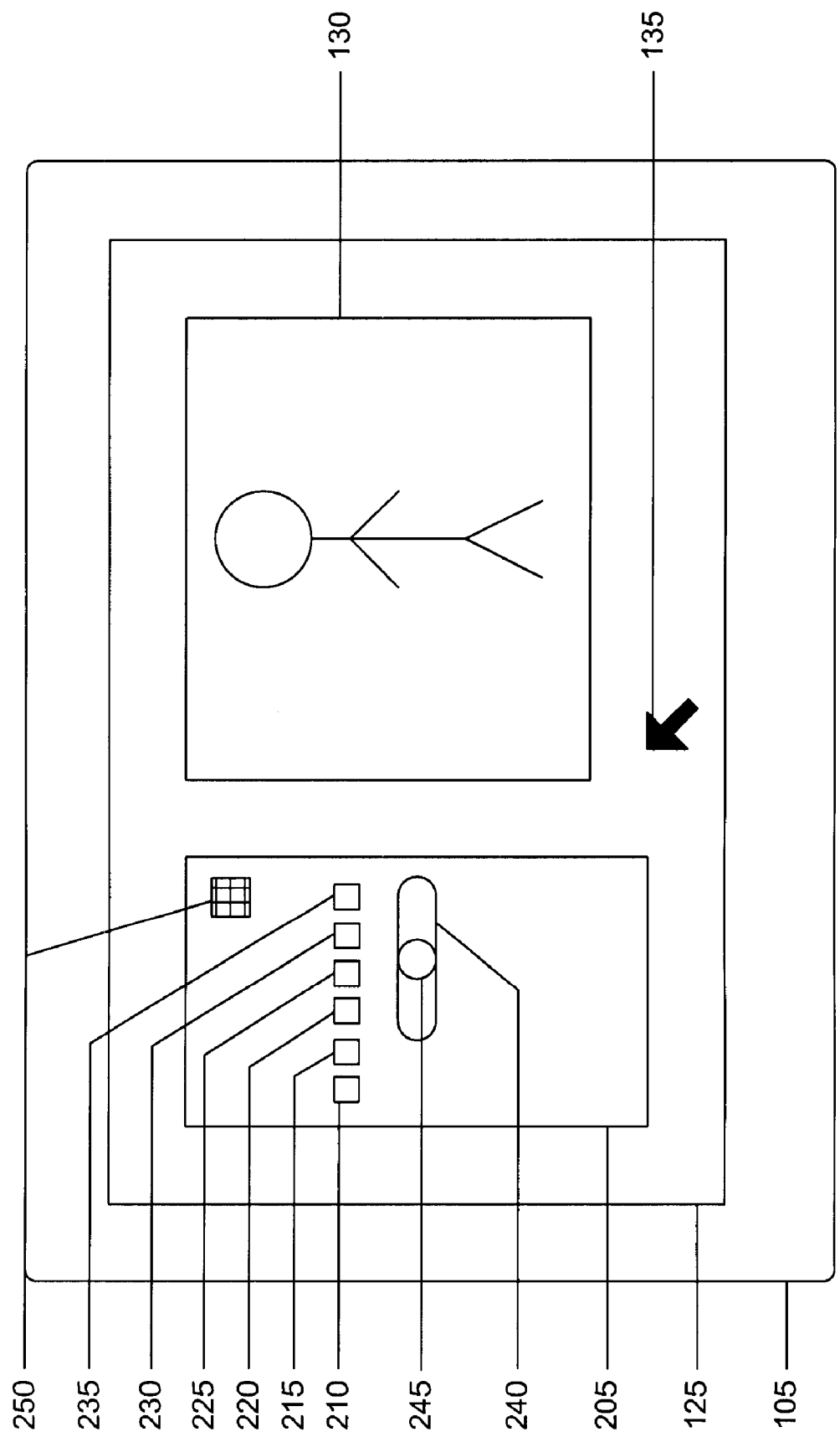
FIG. 2 is a schematic of an example of a user interface in a display device.

FIG. 2 depicts a schematic of an example of a user interface 125 in a display device 105, which includes a compact view of a control panel 205 to control color-attributes of the image 130. The compact view of the control panel 205 includes user interface controls to manage the color attributes of the image 130. In some implementations, the control panel 205 includes a group of color bins, e.g., color bins 210, 215, 220, 225, 230, and 235, that represent the colors in the color spectrum. The color spectrum includes values ranging from 0 to 359 that represent all hues in the color spectrum visible to the human eye where, e.g., 0 represents red, 300 represents magenta, 359 represents a color very close to red, e.g., red with a slight hint of magenta, and each value in between represents a color in the color spectrum between red and magenta.

The color spectrum is divided into multiple segments and each segment is associated with one color bin of the group of color bins displayed in the control panel 205. In some implementations, the color spectrum can be divided equally to create the segments such that the range of values in each segment are equal. In the example shown in FIG. 2, the color spectrum is divided into 6 equal segments and each segment is displayed by a color bin such that bins 210, 215, 220, 225, 230, and 235 represent color values 0-59, 60-119, 120-179, 180-239, 240-299, and 300-359, respectively. Each color bin is displayed in a color included in the segment corresponding to the color bin such that the displayed color is representative of the color bin. For example, a color value at the middle of a segment can be determined and the color bin can be displayed according to the color corresponding to the middle color value. Alternatively, the color value can be any value in the segment, e.g., the first value, the last value, and the like.

The color spectrum can be treated as a color wheel with color values ranging from 0-359 degrees, and each segment can represent a portion of the wheel including a range of color values. For example, the values in the first color segment in the example illustrated in FIG. 2 can be 0-59 degrees. Although the example shown in FIG. 2 includes 6 bins, other examples of user interfaces can include any number of bins depending upon a number of segments into which the spectrum is divided. For example, the group can include 4 bins representing 4 segments of the color spectrum, where each segment includes 90 degrees of the color wheel. In some implementations, the number of segments into which the color spectrum is divided can be altered based on user input. Such alteration causes an automatic change in the number of bins in the group of controls displayed in the control panel 205.

Each color bin, 210-235, is displayed in a color corresponding to a color value in the bin. For example, bins 210, 215, 220, 225, 230, and 235 are displayed in red, yellow, green, cyan, blue, and magenta, respectively, where each color corresponds to a color value at a location, e.g., the middle, of the color segment corresponding to each bin. Each color bin is selectable such that, selecting a color bin enables altering the portions of the image 130 that are displayed in colors included in the selected color bin.

The user interface 125 includes a user interface control 240 configured to enable modifying a color-attribute of the image 130, e.g., hue, based on the colors in a selected bin. In some implementations, the control 240 can be a slider including a button 245, which can be moved to any position within the slider using the cursor 135. The position of the button 245 within the slider 240 corresponds to a color value of a color included in the segment corresponding to the selected bin, e.g., bin 210. In some implementations, the 6 control bins 210-235 represent 6 equal segments of the control spectrum, where bin 210 includes values 0-59 of the color values of the spectrum. In some implementations, the left end of the slider corresponds to a color value that is 60 degrees less than the lower limit of the color values in a selected color bin and the right end corresponds to a color value that is 60 degrees greater than the upper limit of the color values in the selected color bin. For example, if the color bin 210 represents color values from 0-59, then the left end of the slider corresponds to a value of 300 degrees and the right end corresponds to 119 degrees.

In alternative implementations, within the slider 240, the left end corresponds to color value 0, the right end corresponds to color value 59, and positions in between from left to right correspond to values 1 to 58, respectively. Although the example describes integer values for color values, the color values can be rational numbers with a resolution of 0.01 or lower. For example, a color value of a color can be 47.78.

By default, a control bin, e.g., bin 215, is displayed according to a representative hue of the color in the segment to which the bin relates. When a user moves the button 245 within the slider 240, a change in a color-attribute, e.g., hue, occurs in portions of the image 130 displayed in colors included in the segment corresponding to bin 215. For example, as the user moves the button 245 from the middle of the slider 240 to the right, the hue of colors in the image 130 changes and the color in the portions of the image are displayed according to color values that are included between the middle value of the spectrum and the last value of the spectrum corresponding to bin 215. Similar movements of the button 245 between the middle and the left end of the slider 240 cause changes in hue to portions of the image 130 displayed according to color values included between the left value and the middle value of the spectrum corresponding to bin 215. Further, the change in hue is more significant in portions of the image 130 that are displayed in the representative color than in portions of the image 130 that are displayed in colors in the segment that are not displayed in the representative color. Portions of the image 135 that are displayed in colors not included in the segment are not affected by a change in the position of the button 245.

For example, the representative color value of the segment corresponding to bin 215 is yellow, where the representative value is the middle value of the segment. When a user positions the cursor 135 over bin 215 and selects the bin, the slider 240 enables altering a hue of the color of portions of the image 130 that are displayed in the colors included in the color segment corresponding to the bin 215. When the user moves the button 245 to different positions within the slider, the hue of the colors of portions of the image 130 that are displayed in the colors included in the corresponding color segment also change, while portions displayed in colors outside the color segment remain unaffected. Also, the hue of the color of portions of the image 130 that are displayed in yellow change more significantly in comparison to that of portions of the image that are not displayed in yellow. As the button 245 is moved within the slider 240 and the hue of the color is changed, the display in the display device 105 is automatically updated to display the image 105 according to the changed hue.

Subsequently, to change colors of portions of the image 130 that are included in other segments of the color spectrum, the user can select another color bin displayed in the user interface 125 using the cursor 135. For example, the user can select bin 220, and in response, the slider 240 is automatically updated to enable altering color values of colors that are included in the color segment corresponding to bin 220. Then, the user can move the button 245 to different positions within the slider 240, thereby causing a change in the colors of portions the image 130 that are displayed in colors included in the color segment corresponding to bin 220. In this manner, the user can use the same slider 240 to alter colors of the entire color spectrum while still being able to select segments of the color spectrum that the user wishes to manipulate.

Although the example user interface 125 shown in FIG. 2 includes one user interface control represented by the slider 240, any number of controls can be displayed where each control represents one color attribute of the image. For example, other controls can be displayed as sliders with buttons, where the sliders represent attributes including saturation, luminance, and the like, and moving the position of the buttons within the sliders causes corresponding changes to the color-attribute of the image 130.

In some implementations, the color spectrum can be unevenly divided into segments such that a number of color values in each segment is different from one another. For example, a default view of the control panel 205 can include a group of control bins where a number of color values in each bin are equal to one another. The user interface 125 can include a user interface control (not shown) configured to change the number of color values in a segment corresponding to a bin. In some implementations, if the number of color values in a segment are increased, then the additional values can be obtained from the adjacent segment. In some implementations, the number of color values in a segment can be decreased to a smaller range, thereby enabling a user to finely control the colors of the image using the color values that are included in the smaller range.

The control panel 205 in the user interface 125 includes a view control 250 that is configured to change the view of the user interface from a compact view, as displayed in the example user interface 125, to an expanded view. In the expanded view, each color bin 210-235 is associated with a corresponding user interface control to manipulate colors in the color segment corresponding to the color bins.

Figure 3:
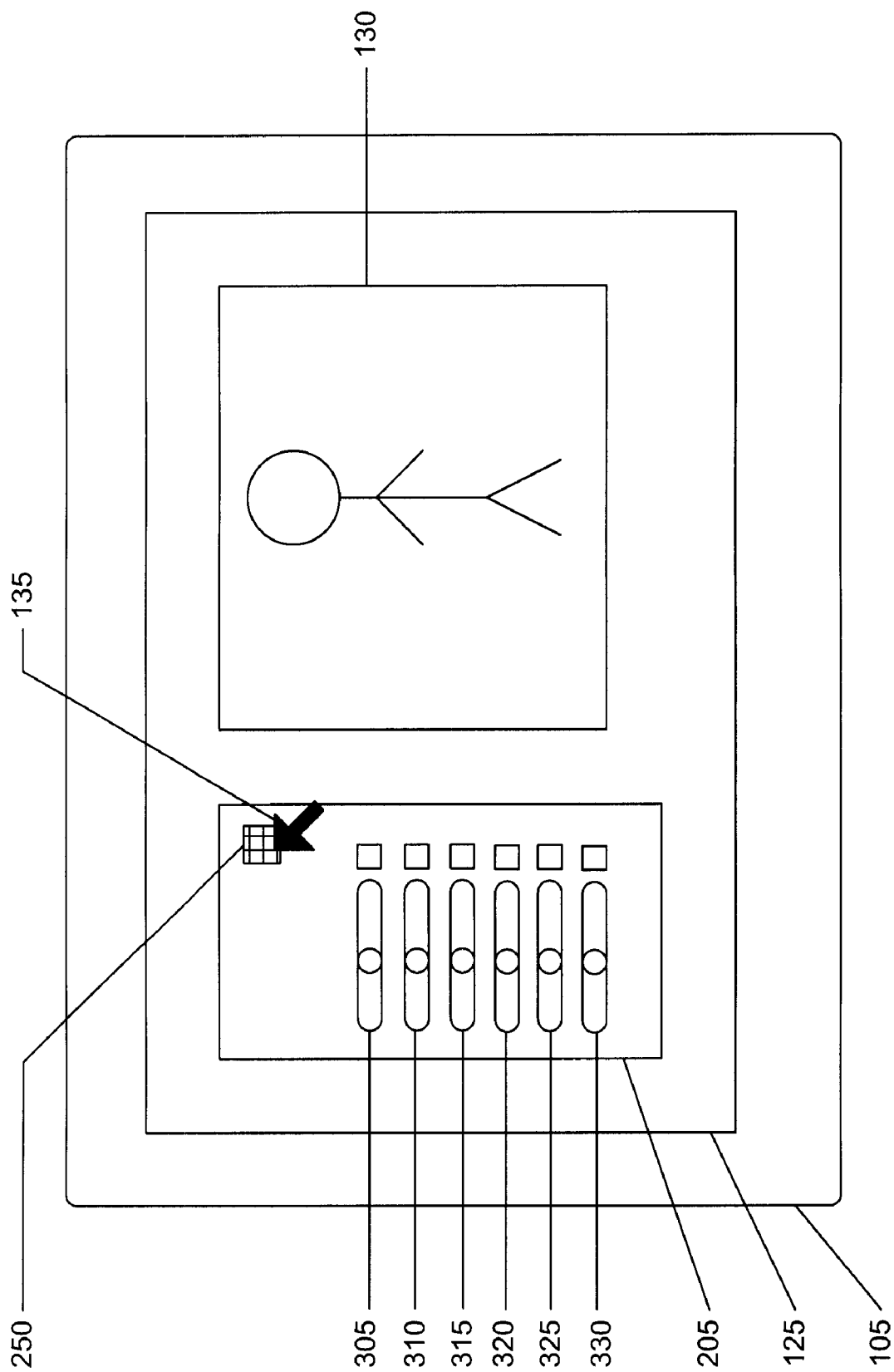
FIG. 3 is a schematic of an example of a user interface in a display device.

FIG. 3 depicts a schematic of an example of a user interface 125 in a display device 100, which represents an expanded view of the control panel 205 to control color-attributes of the image 130. The expanded view of the control panel 205 includes a user interface control for each color segment into which the color spectrum is divided. In the example illustrated in FIG. 2, the color spectrum was divided into 6 segments that were displayed as 6 control bins 210-235. When a user selects the view control 250, e.g., using the cursor 135, the expanded view of the control panel 205 is displayed and the compact view is hidden from display. The expanded view of the control panel 205 includes 6 user interface controls that include 6 sliders 305, 310, 315, 320, 325, and 330, where each slider corresponds to one of the 6 color segments into which the color spectrum is divided. Thus, sliders 305, 310, 315, 320, 325, and 330 are used to change the color-attributes, e.g., a hue, of the colors included in the color segments represented by the color bins 210, 215, 220, 225, 230, and 235, respectively.

For example, if the color values of the colors in the color bin 220 range from 120-179, then the slider 315 can be used to change the hue of portions of the image 130 that are displayed according to color values 120-179 because slider 315 in the expanded view of the control panel 205 corresponds to color bin 220 in the compact view of the control panel 205. Objects, e.g., rectangular objects, can be displayed adjacent to each of the sliders 305-330, where an object adjacent to a slider is displayed in the representative color of the color bin to which the slider corresponds. In this manner, the user can be provided with multiple user interface controls to alter the colors of portions of the image 130. Objects can be displayed adjacent to each user interface control in the representative color of the color bin to which the user interface control corresponds to aid the user to identify the colors of the image that will be affected by the user interface control.

Although the example illustrated in FIG. 3 shows one user interface control corresponding to each control bin from the compact view, multiple groups of user interface controls can be displayed in the control panel 205 such that each group corresponds to one control bin. The user interface controls in a group can be used to alter color-attributes such as hue, saturation, luminance, and the like, of the colors that are included in the color segment that is represented by the color bin to which the group of user interface controls corresponds. A user can switch between the compact view and the expanded view of the control panel by selecting the view control 135 displayed in the user interface 125. The compact view and the expanded view provide the user with two options to alter color-attributes of the image 130. In some implementations, an image of a grid can be displayed within the view control 250 to indicate to the user that selecting the view control 250 can enable switching between the compact and expanded view of the control panel 205.

FIGS. 4A and 4B are schematics of examples of a user interface 125 in a display device 105. The user interface 125 includes a compact view of the control panel 205 including color bins 210-235 representing 6 color segments into which the color spectrum is divided. Each color bin is displayed in a representative color. The user interface 125 includes a user interface control represented by a slider 240. The button in the slider 240 is positioned in the middle of the slider 240 to indicate that the representative colors in the segment to which a color bin is associated are unchanged. Alternatively, the button can be positioned at any location within the slider 240 and the position of the button can be independent of the representative color in the color segment. When a user moves the button within the slider 240, a change in a color-attribute, e.g., hue, occurs in portions of the image 130 displayed in colors included in the segment corresponding to bin 215. The change in hue is more significant in portions of the image 130 that are displayed in the representative color than in portions of the image 130 that are displayed in colors in the segment that are not displayed in the representative color. Portions of the image 135 that are displayed in colors not included in the segment corresponding to bin 215 are not affected by a change in the position of the button 245.

For example, because the representative color of the color bin 215 is yellow, moving the button 245 within the slider 240 causes more change to the hue of portions of the image 130 displayed in yellow when compared to the portions of the image 130 that are not displayed in yellow. Further, portions of the image 130 that are displayed in colors adjacent to yellow in the color spectrum undergo more change in comparison to portions of the image 130 that are displayed in colors that are in the same color segment but farther away from yellow in terms of color values.

The control panel 205 includes a selection control 405 that allows a user to select a different hue for the representative color of the segment. Since the representative color of the color segment undergoes the most change when the button in the slider 245 is moved, changing hue of the representative color of a color segment enables a user to affect portions of the image 130 displayed in the representative color. A compact view of the control panel 205 includes the color bins 210-235 and the selection control 405. To vary a hue of the representative color, of a color bin, e.g., bin 225, the user first selects color bin 225. Because bin 225 is selected, the slider 245 can change color-attributes, e.g., the hue, in portions of the image 130 that are displayed in the colors included in the color segment corresponding to bin 225. FIG. 4A illustrates a default state of the compact view of the control panel 205 where bin 225 is selected using the cursor 135.

FIG. 4B illustrates a state of the compact view of the control panel 205 where bin 225 is selected using cursor 135 and the cursor 135 is positioned over the image 130. When the cursor 135 is positioned over the image 130, the display of the cursor 135 in the display device 105 changes from e.g., an arrow image in a default state to e.g., an eye-dropper image 410 after the selection control 405 has been selected. The change in display of the cursor 135 is merely an indication to the user that the control panel 205 is in a state where the user can select a representative color for the color bin and may be optional. Further, the display of the cursor 135 can be changed to any image after the selection control 405 is selected.

The user can position the cursor 135, displayed as the eye-dropper image 410, at any position in the image 130 and select the position. When the cursor 135 is positioned over a pixel of the image 130, the pure hue of the pixel is determined. For example, if the user were to place the cursor 135 above white clouds in an image, the user can determine that the hue of clouds is cyan, where the cyan hue at low saturation and high luminance creates the true color of the clouds. In some implementations, when the selection control 405 is selected and the cursor 135 is positioned over the image 130, an object 415 can be displayed in the user interface 105, e.g., over the image 130, and the hue at the point on the image 130 over which the cursor 135 is positioned can be displayed in the object. This can aid a user to identify the hue that the user will select to be the new hue of the representative color of the color bin 225.

In response to the selection of the position on the image 135, the hue of the representative color of the bin 225 is replaced by the hue of the selected position. In some implementations the color segments associated with two color bins can include overlapping colors. An additional user interface control (not shown) can be provided to control a range of color values associated with a color segment. Using the additional user interface control, the range of color values associated with one color segment can be narrowed. In this manner, one color bin can be used to control a narrow range of color values while another color segment can be used to control a wide range of color values.

When the user selects the selection control 405 and then selects a point in the image 130, the color bin 225 is displayed in the new hue value of the representative color. Subsequently, when the slider 245 is used to change the color-attributes, e.g., the hue, of the image 130, portions of the image that are displayed according to the new hue value of the representative color undergo more change than portions of the image 130 that are displayed according to other color values. Further, portions of the image 130 that are displayed in colors that are not included in the color segment corresponding to the selected color bin remain unaffected.

For example, the color bin 215 represents the color segment including color values 60-119 with yellow as the representative color. The user selects the selection control 405 and moves the cursor 135 over the image 130 causing the display of the cursor 135 to change from an arrow image to an eye-dropper image 410. The user moves the cursor 135 over the image 130 to select a point in the image 130. An object 415 is displayed in the user interface 125, e.g., over the image 130, where the color of the object 415 is continuously updated to display the hue of the point on the image 130 over which the cursor 135 is positioned. The user selects a position on the image 135 where the color of the position is orange. Orange is assigned as the new hue of the representative color of bin 225 and the yellow color displayed in bin 225 is replaced with an orange color. Subsequently, when slider 245 is moved to alter the color-attributes, e.g., a hue, of the image 130, portions of the image 130 that are displayed in orange are affected more in comparison to portions of the image 130 that are displayed in colors included in the color segment corresponding to bin 225 that are not orange. Portions of the image 130 that are displayed in colors that are not in the color segment corresponding to bin 225 remain unaffected.

Figure 5:
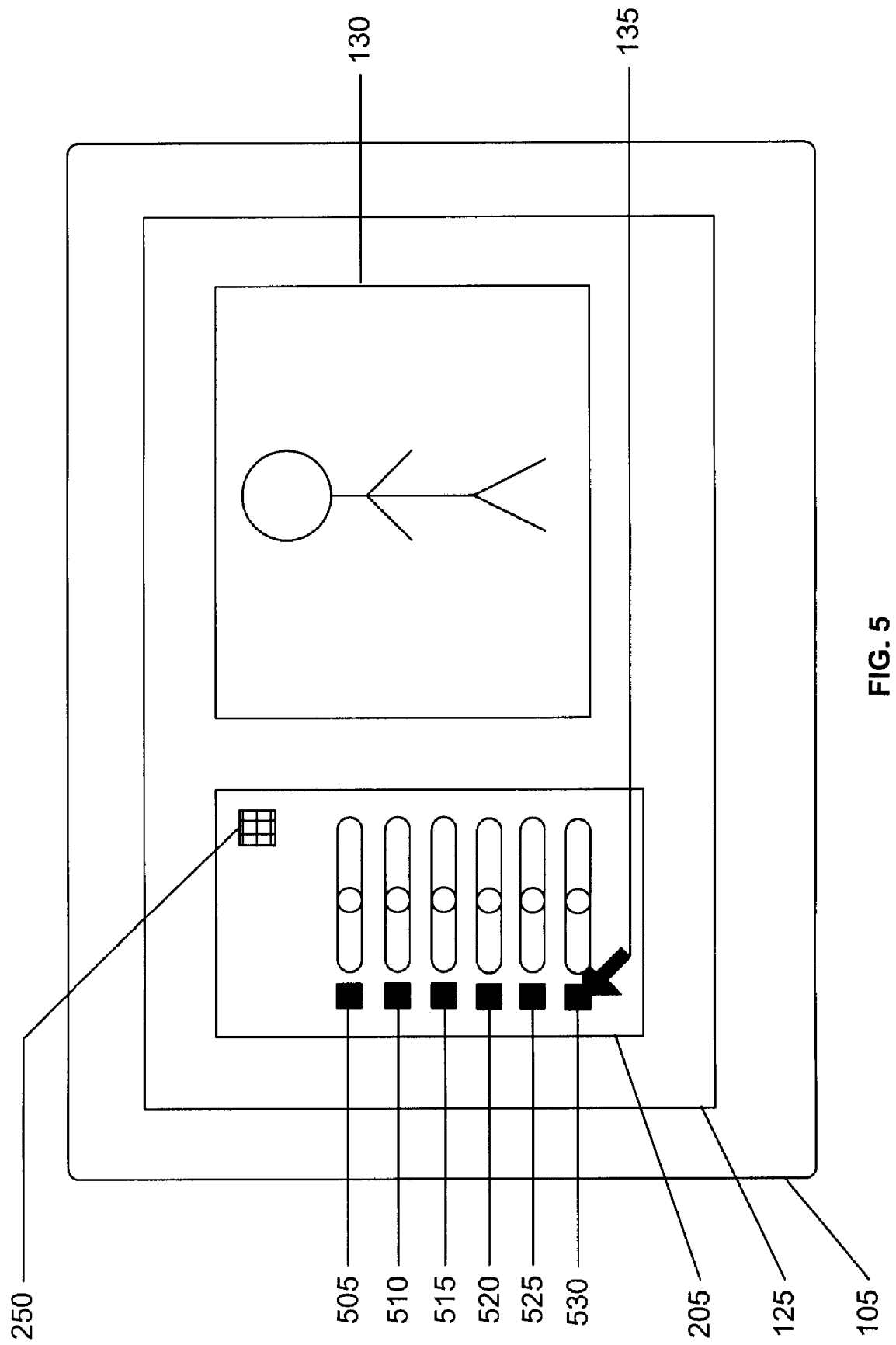
FIG. 5 is a schematic of an example of a user interface in a display device.

FIG. 5 depicts a schematic of an example of a user interface 125 in a display device 100, which represents an expanded view of the control panel 205 to control color-attributes of the image 130. In the expanded view, the control panel 205 includes a user interface control corresponding to each color bin that was displayed in the compact view. In FIGS. 4A and 4B, the color segment was divided into 6 color bins, 210-235, and the slider 240 and the selection control 405 were common to the 6 color bins. In the expanded view, 6 user interface controls and 6 selection controls 505, 510, 515, 520, 525, and 530 are displayed corresponding to the 6 color bins. For example, each selection control can be displayed adjacent to a user interface control. The combination of the selection control and the user interface control is used to change color-attributes, e.g., hues, of portions of the image 130 that are displayed in colors included in the color segment. Selecting one of the selection controls 505-530 causes the display of the cursor 135 to be altered from, e.g., the arrow image to, e.g., the eye-dropper image, when the cursor 135 is positioned over the image 130. A user can position the cursor 135 at different locations over the image 130 and select a hue to be the new hue of the representative color of the color bin corresponding to the selection control that the user selected. The user interface control, e.g., the slider, can be used to more significantly change the color of portions of the image 130 that are displayed in the new hue when compared to portions of the image 130 that are displayed in colors that are not the new hue. Portions of the image 130 that are not included in the color segment remain unaffected.

For example, in a compact view, the control panel 205 can include 6 control bins, one slider common to the 6 color bins, a view control 250, and a selection control 405. The user can select the view control 250 to cause the control panel 205 to be displayed in an expanded view. Because the control panel 205 included 6 color bins in the compact view, the expanded view of the control panel 205 includes 6 sliders, 6 selection controls 505-530 adjacent to the 6 sliders, and the view control 250. In some implementations, each of the selection controls 505-530 can be displayed in the representative color of the color bin to which the selection control corresponds. Further, to enable a user to identify that the selection control is a selectable object, an image, e.g., an eye-dropper image, can be displayed within the selection control.

The user can use each of the sliders to change color-attributes, e.g., hues, of portions of the image 130 that are displayed in colors included in the color segment of the color bin to which the slider corresponds. For example, the user can move the button within each slider causing the change in colors. The image 130 is automatically updated and displayed according to the new color. Portions of the image 130 that are displayed in the hue of the representative color of the color bin corresponding to the selected user interface control undergo more change in comparison to portions of the image 130 that are displayed in hues of colors other than the representative color. Colors of the image 130 that are displayed in colors not included in the color segment remain unchanged.

To change the representative color of a color bin, the user selects the selection control corresponding to the color bin, e.g., selection control 530. Subsequent to the selection, when the user moves the cursor 135 to a position over the image 130, the display of the cursor 135 changes from the arrow image to an eye-dropper image, indicating to the user that a new representative color can be chosen. In some implementations, when the cursor 135 is positioned over the image 130, an object (not shown in FIG. 5) can be automatically displayed in the user interface 125, e.g., over the image 130, that displays the hue at the position of the cursor 135. As the user moves the cursor 135 over the image 130, the hue in the object can be updated enabling the user to see the color of the position of the image 130 over which the cursor 135 is positioned.

The user can select a position on the image 130, and in response, the hue of the selected position is assigned as the new hue of the representative color of the color bin corresponding to selection control 530. Subsequently, when the user moves the button within the slider adjacent to selection control 530, portions of the image 130 that are displayed in the new hue change more in comparison to portions of the image 130 that are not displayed in the new hue. Further, portions of the image 130 that are displayed in colors located adjacent to the new representative color in the color spectrum change more in comparison to portions of the image 130 that are displayed in colors located away from the new representative color, but within the same color segment. In this manner, a gradient of color change is established where the representative color of the color bin and colors adjacent to the representative color in the color spectrum are affected more when color-attributes of the image 130 are changed when compared to colors located away from the representative color and colors located outside the color segment.

Although the example user interface 125 shown in FIG. 5 illustrates one slider adjacent to each selection control, a selection control can be related to a group of sliders, where each slider in a group can be used to change color-attributes including a hue, a saturation, a luminance, and the like. Further, in the compact view of the control panel 205, the color bins represent the color segments and the selection control is common to the color bins. The color bins and the selection control are selectable objects that are separately selected to manipulate colors of the image 130. In the expanded view, the color bin and the selection control are combined into one selectable object such that each color segment includes a corresponding color bin/selection control combination that can be used to manipulate colors of the image 130. Because a color bin and the selection control are combined in the expanded view, a separate selection control is not displayed.

Figure 6A:
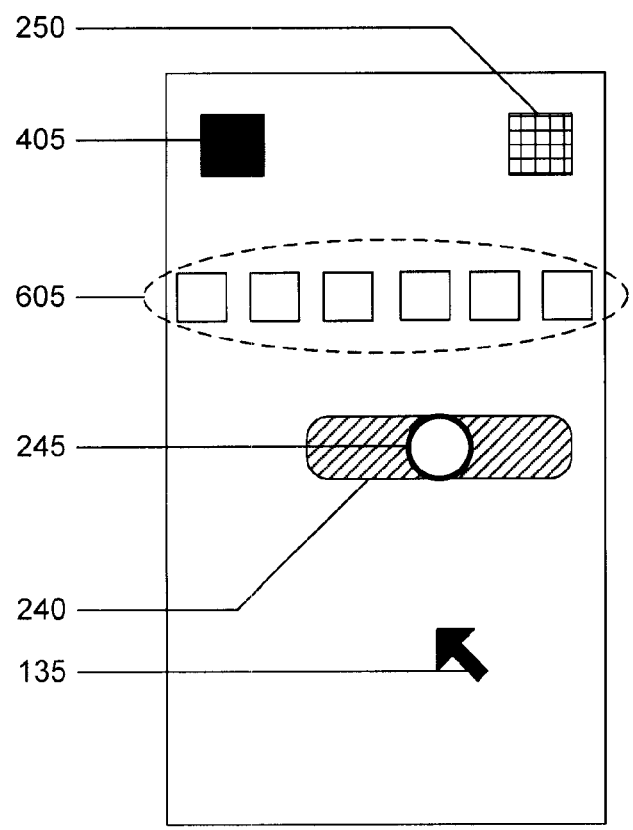
FIGS. 6A and 6B are schematics of examples of control panels in a display device.
Figure 6B:
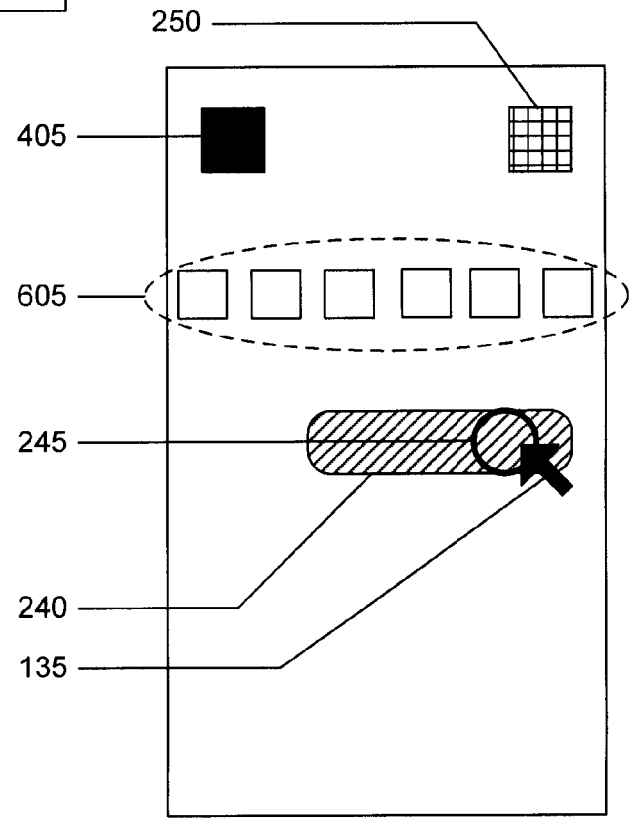

FIGS. 6A and 6B are schematics of examples of control panels 205 in a display device 105. The control panels 205 are displayed in a compact view and include a collection of color bins 605 corresponding to color segments that collectively represent the color spectrum, a view control 250 to switch between the compact view and the expanded view, a selection control 405 to enable changing the representative colors of the color bins, a slider 240 and a button within the slider 245 to change color-attributes, e.g., hues, of an image. In some implementations, when a user selects a color bin from the collection of color bins, the slider 240 is displayed according to a gradient of colors included in the color segment to which the selected color bin corresponds. The colors in the gradient depend on the range of colors in each color segment. For example, if a color bin represents a color segment that includes a range of colors from red to green, when the color bin is selected, the slider displays a gradient of colors from red to green with red displayed at the left end of the slider and green displayed at the right end of the slider.

The brightness of the gradient of colors in the slider 245 increases when the cursor 135 is positioned at any position over the slider as well over the button 245. When the cursor 135 is moved away from the slider and/or the button, the brightness of the gradient of color decreases. In some implementations, the button 245 is displayed in a default color when the cursor 135 is positioned away from the button 245, as illustrated in FIG. 6A. When the cursor 135 is positioned over the button 245, the button 245 is displayed in the same colors as the colors of portions of the slider 240 that lie beneath the button 245, as illustrated in FIG. 6B. As the button 245 is moved to different positions within the slider 240, the display of colors in the button 245 is automatically updated to match the colors of portions of the slider 240 that lie beneath the button 245. In some implementations, the color of the button 245 can continue to be displayed according to the colors of portions of the slider that lie beneath the button 245. Further, when the cursor 135 is moved away from the slider, the brightness of the colors in the slider decreases.

In some implementations, the gradient of colors displayed in the slider 240 can correspond to a portion of a color segment. For example, the gradient of colors can represent an equal number of color values on either side of the representative color of the color segment. Even though the gradient of colors in the slider 240 represents only a portion of the color segment, the slider 240 can be used to manipulate all the colors in the corresponding color segment. Further, when the representative color value of the color bin is changed to a new representative color value, the gradient of colors in the slider 245 can also be changed to represent an equal number of color values on either side of the new representative color value. Further, the button 245 can extend beyond the boundaries of the slider 240. In such instances, when the cursor 135 is placed over the button 245, the entire area of the button 245 can be displayed according to the colors of portions of the slider 240 that lie beneath the button 245. Alternatively, colors in areas of the button 245 that lie outside the boundaries of the slider 240 need not be affected by a change in the position of the cursor 240.

In implementations where the control panel 205 includes more than one slider, each slider can be displayed according to a gradient of colors that corresponds to the color-attribute that the slider is configured to change. For example, one of the sliders can be a saturation control that is configured to change the saturation level of a color in a color segment, then the gradient of color in the slider can range from an unsaturated display of the color in the left end of the slider to a saturated display in the right end of the slider. The color in the slider can be the representative color of the bin. When the representative color is changed to a new representative color, the color of the saturation control is automatically changed to that of the new representative color. Similarly, additional user interface controls, e.g., sliders, configured to change additional color-attributes of the image 130 can be included in the control panel 205 and displayed according to colors of the corresponding color segment.

Figure 7:
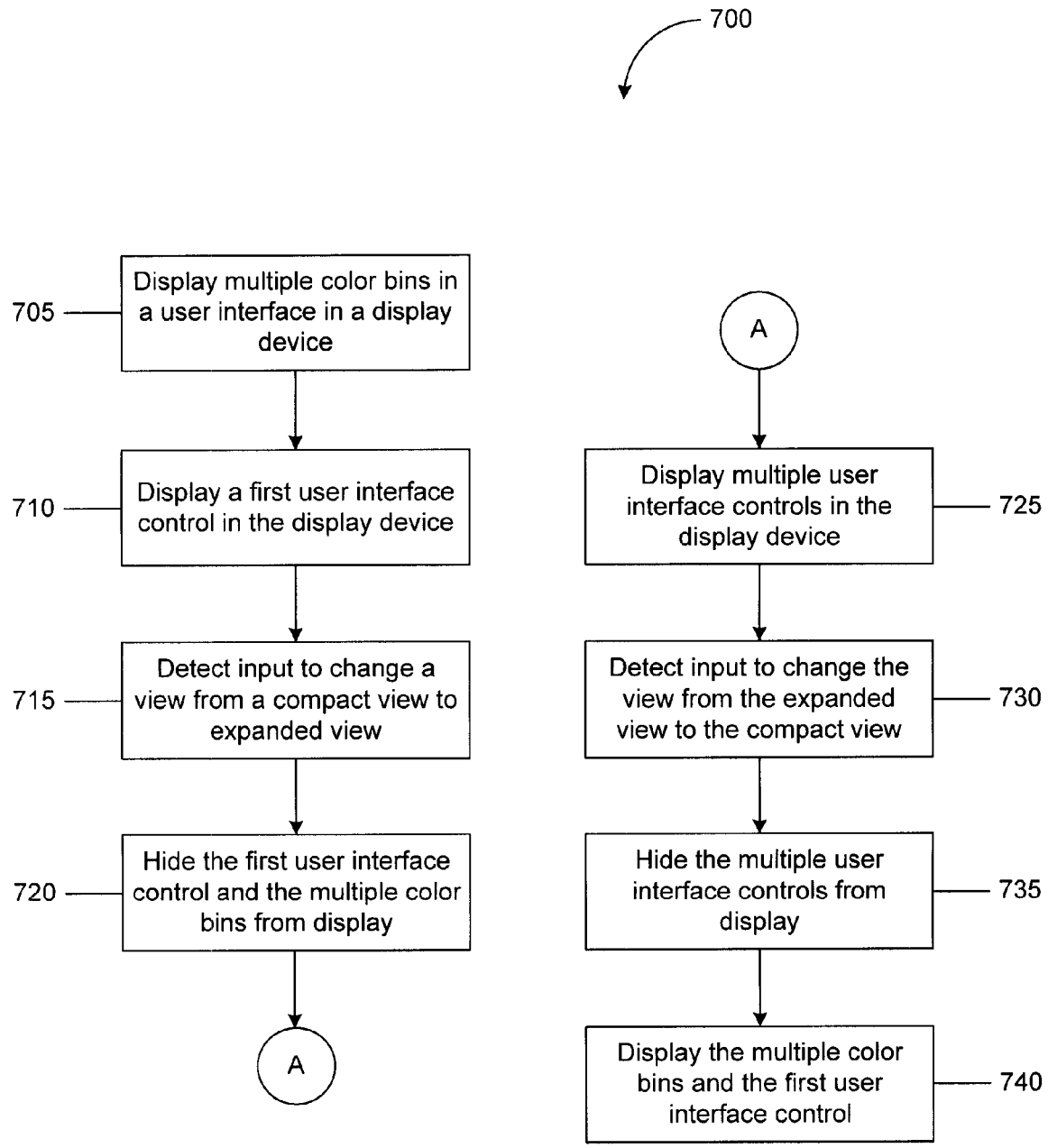
FIG. 7 is a flowchart of an example process for presenting a compact view and an expanded view of a user interface for changing color attributes.

FIG. 7 is a flowchart of an example process 700 for presenting a compact view and an expanded view of a user interface for changing color attributes. The process 700 can display multiple color bins in a user interface in a display device. For example, in response to receiving input, a software application installed on a computer system can display a user interface in a display device of the computer system, and display a multiple color bins in the user interface. Each color bin represents a corresponding segment of a color spectrum and the application can display each color bin in a color that is included in the corresponding spectrum. The application can cause each color bin to be selectable such that selecting a color bin enables assigning color included in the corresponding segment to a content item, e.g., an image.

The process 700 can display a first user interface control in the display device at 705. For example, the software application can be configured such that the first user interface control is displayed in the user interface when the color bins are displayed. The application can be configured such that the first user interface control is used to assign color to the content item based on the selected color bin. The first user interface control can be a slider common to all the color bins such that when a color bin is selected, the slider can be used to assign colors in the color segment corresponding to the selected color bin to an image.

The process 700 can detect input to change a view from a compact view to an expanded view at 715. For example, the software application can be configured to include the view control in the user interface along with the multiple color bins and the first user interface control. The view control, the multiple color bins, and the first user interface control can collectively represent the compact view of the user interface. The view control can be a selectable object which can be selected using a cursor. The selection of the view control serves as an input indicating that the view needs to be changed to the expanded view.

The process 700 can hide the first user interface control and the multiple color bins from display at 720. For example, when the view control is selected using the cursor, the compact view of the user interface can be hidden from display.

The process 700 can display multiple user interface controls in the display device at 725. For example, the application can be configured to display multiple sliders in the display device where each slider corresponds to a segment of the color spectrum. Thus, if 6 color bins were displayed before the view control was selected, then 6 sliders are displayed in the display device where each slider corresponds to a color bin. Further, each slider can be configured to assign color included in the corresponding color segment to the image. The multiple user interface controls displayed in the display device collectively represent the expanded view. While in the compact view, the control bins share a common slider, in the expanded view, each control bin includes a corresponding slider. Further, in the expanded view, an object, e.g., a rectangular image, can be displayed adjacent to each slider in a color of the color bin to which the slider corresponds. In this manner, a user can identify the color bin to which the slider corresponds based on the color of the object adjacent to the slider.

An image can be displayed in the user interface in the display device and a slider in the user interface can be used to assign and change colors to portions of the image. When a color of the image is changed and a new color is assigned, the image can be automatically updated and displayed in the new color.

The process 700 can detect input to change the view from the expanded view to the compact view at 730. For example, the expanded view of the user interface can include the view control. In the expanded view, a user can select the view control which serves as an input that the user wishes to replace the expanded view with the compact view.

The process 700 can hide the multiple user interface controls from display at 735 and display the multiple color bins and the first user interface control at 740. For example, in response to a selection of the view control, the application can replace the expanded view with the compact view. In this manner, a user can switch between the compact view and the expanded view using the view control.

Figure 8:
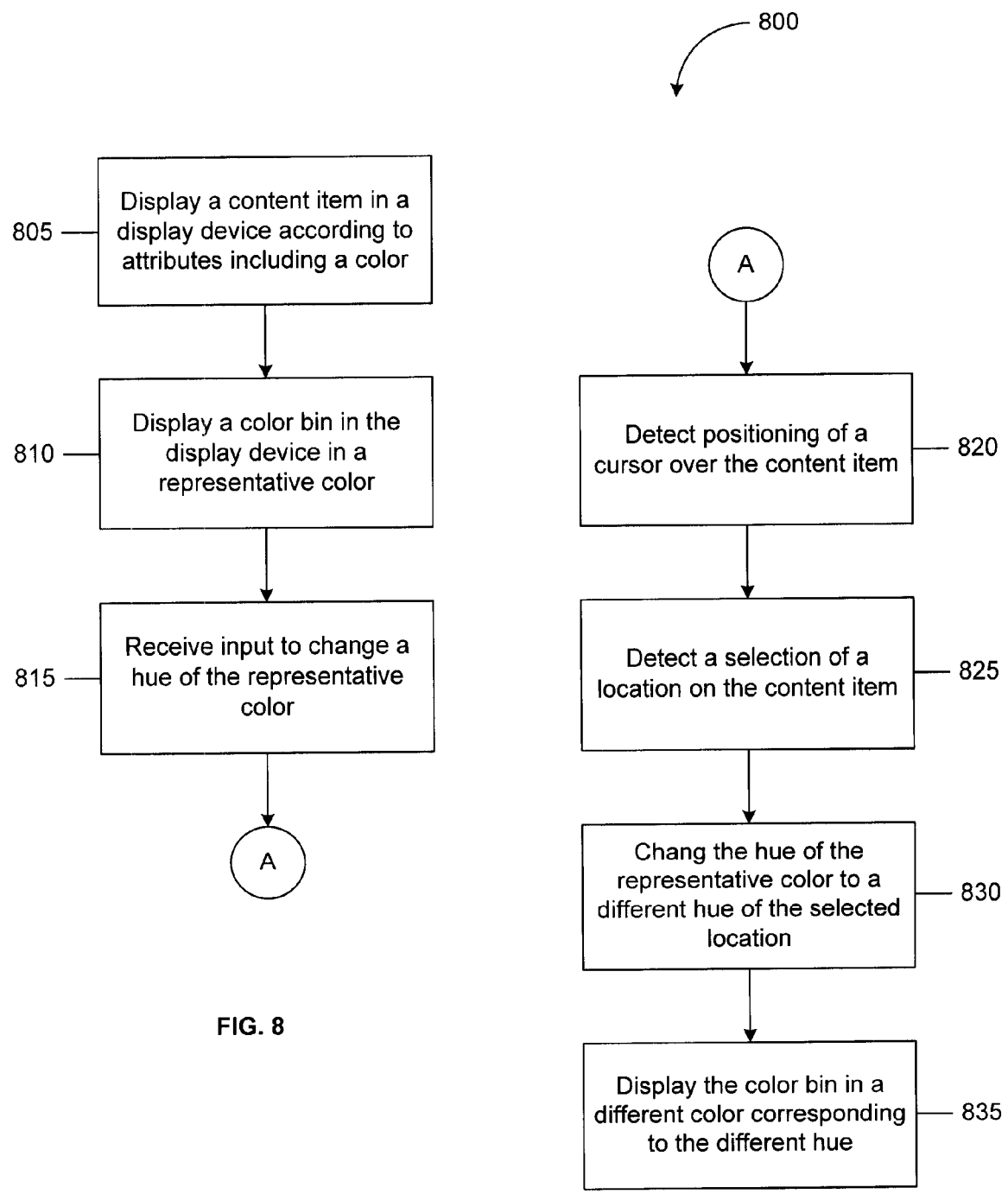
FIG. 8 is a flowchart of an example process for selecting a color at a point on an image as the basis for altering color attributes of the image.

FIG. 8 is a flowchart of an example process 800 for selecting a color at a point on an image as the basis for altering color attributes of the image at 805. The process 800 displays a content item in a display device according to color attributes including a color from a color segment. For example, the software application can be configured to retrieve a color image from a storage device and display the image in a display device.

The process 800 displays a color bin in the display device in a representative color at 810. The color bin can be related to a segment of the color spectrum and displayed in a color corresponding to a representative color of the segment. The color bin is selectable wherein selecting the color bin can enable changing hue of colors of the content item based on the segment. For example, the software application can be configured to divide the color spectrum into multiple color segments. The application can display the color bin in the display device to represent one of the color segments. The color bin can be displayed in a color that is representative of the color segment, e.g., the color at a location in the segment. When the color bin is selected, a slider displayed in the user interface can be used to change the hues of colors of the image to colors that are included in the color segment corresponding to the selected color bin.

The process 800 receives an input to change a hue of the representative color at 815. For example, the user interface can include a selection control that a user can select using a cursor. Selecting the selection control serves as an input indicating that the user wishes to change the hue of the representative color of the color bin and thereby facilitates changing the hue of the representative color to a different hue.

The process 800 detects positioning of a cursor over a portion of the content item at 820. For example, a user can select the selection control and move the cursor to a position over the image in the display device. The application can detect that the selection control has been selected and that the cursor is positioned over the image.

The process 800 detects a selection of a location on the content item at 825. For example, the user can position the cursor at a location on the content item and select the location. The application can detect this selection The process 800 changes the hue of the representative color to the hue of the selected location at 830. For example, the user interface can include an object that displays the hue of the location, e.g., the pixel in the display device, over which the cursor is positioned. The user can select the location based on the displayed hue. The application can change the hue of the representative color of the color bin to the hue of the selected location.

The process 800 can display the color bin in a different color corresponding to the different hue at 835. For example, once the hue of the representative color of the color bin is changed to a new hue, the color bin can be displayed in a color corresponding to the new hue.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations described in the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. In some implementations, text fields can be displayed adjacent to each slider in the control panel. The text fields can display the color values that are assigned to the image. Further, the text fields can be configured to receive input related to the color values. For example, the user can identify the range of color values in a color segment by moving the button in a slider corresponding to the color bin of the color segment to the left end and the right end. Subsequently, the user can enter a value within this range in the text field. In response, the image can be displayed according to the color value entered in the text field, and the position of the slider can be automatically updated to correspond to the entered value.

Each color bin displayed in the user interface can have a default range of hue values. In some implementations, the range of hue values can be increased using both the slider and the text fields, e.g., by 120 values from the default range. In some implementations, the range of hue values can be increased more using text fields and less using the slider. For example, a user can enter a range that is 120 values greater than the default range in the text field. Further, the user interface can include a slider to control the range. Moving the button in the slider to either end of the slider can correspond to an increase of 60 values from the default range.

In some implementations, the user can select the text fields into which values can be entered. The users can use arrow keys on the keyboard, e.g., the left arrow key and the right arrow key, to change the hue values in the text field.

In some implementations, the user can save and load "Presets" for color adjustment, where the "Presets" enable a user to save any combination of custom color bins that are created for an image and use the saved "Presets" for a different image that may have similar content or entirely different content.

In some implementations, when the user interface can include an overlay displayed over the image in the user interface to enable a user to view exact locations on the image where hue values will be affected. For example, the user can hold down a key on the keyboard, e.g., the "Command" key, and select the button in the slider using the pointing device. In response, an overlay can be displayed on the image that indicates portions of the image that will be affected if the user moves the position of the button in the slider. In some implementations, the overlay can include displaying black in all portions of the image except the portions that will be affected. In other implementations, the overlay can include displaying white over all portions of the image except the portions that will be affected. In other implementations, the overlay can include displaying a neutral color over portions of the image that will not be affected. When the user releases the key, the overlay can be removed from display. In addition to indicating positions on the image that will be displayed, the overlay can also include the strength of the modification, where the strength can be represented by different appearances including desaturation, red dot, black dot, invert the image's chromatic value at that pixel, and the like.

In some implementations, the user interface can be located at a remote location and displayed in a display device of a client computer system operatively coupled to the remote location through one or more networks. Images that are stored in storage devices operatively coupled to the client computer system can be uploaded and displayed in the user interface and manipulated as described. Further, images can be transferred to the remote location, uploaded in the user interface, manipulated as described, and stored either in remote storage locations or in local storage devices operatively coupled to the client computer system. Further, the actions recited in the claims can be performed in a different order and still achieve desirable results.

What is claimed is:

1. A method performed by one or more processes executing on a computer system, the method comprising:
displaying a plurality of color bins in a user interface, each color bin representing a segment of a color spectrum, each color bin having a representative color that resides in the associated color spectrum segment, wherein each segment includes a plurality of color values, each representative color representing a color value at a location in the associated segment, and each color bin is selectable such that selecting a color bin enables varying colors in a content item corresponding to the color bin's associated segment;
displaying in the user interface, a first user interface control configured to vary colors in the content item based on the selected color bin; and
in response to input, displaying a plurality of user interface controls in the user interface, each user interface control associated with a segment of the color spectrum, each user interface control configured to vary colors in the content item corresponding to an associated color spectrum segment.

2. The method of claim 1, further comprising hiding the first user interface control and the plurality of color bins from display, in response to the input.

3. The method of claim 1, further comprising displaying an input object in the user interface, the input object configured to receive the input.

4. The method of claim 1, further comprising displaying the content item in the user interface.

5. The method of claim 1, wherein varying color in the content item causes the content item to be displayed according to the varied color.

6. The method of claim 1, wherein the first user interface control comprises a slider including a button located at a changeable position within the slider, wherein the position of the button within the slider corresponds to a color attribute in the content item.

7. The method of claim 1, further comprising, in response to receiving input:
hiding the plurality of user interface controls from display;
displaying the first user interface control; and
displaying the plurality of color bins.

8. The method of claim 1, wherein a user interface control of the plurality of user interface controls comprises one or more of a hue control, a saturation control, and a luminance control.

9. A computer program product, tangibly stored on a computer-readable medium, operable to cause data processing apparatus to perform operations comprising:
displaying a plurality of color bins in a user interface, each color bin representing a segment of a color spectrum, each color bin having a representative color that resides in the associated color spectrum segment, wherein each segment includes a plurality of color values, each representative color representing a color value at a location in the associated segment, and each color bin is selectable such that selecting a color bin enables varying colors in a content item corresponding to the color bin's associated segment;
displaying in the user interface, a first user interface control configured to vary colors in the content item based on the selected color bin; and
in response to input, displaying a plurality of user interface controls in the user interface, each user interface control associated with a segment of the color spectrum, each user interface control configured to vary colors in the content item corresponding to an associated color spectrum segment.

10. The computer program product of claim 9, the operations further comprising hiding the first user interface control and the plurality of color bins from display, in response to the input.

11. The computer program product of claim 9, the operations further comprising displaying an input object in the user interface, the input object configured to receive the input.

12. The computer program product of claim 9, the operations further comprising displaying the content item in the user interface.

13. The computer program product of claim 9, wherein varying color in the content item causes the content item to be displayed according to the varied color.

14. The computer program product of claim 9, wherein the first user interface control comprises a slider including a button located at a changeable position within the slider, wherein the position of the button within the slider corresponds to a color attribute in the content item.

15. The computer program product of claim 9, the operations further comprising, in response to receiving input:
hiding the plurality of user interface controls from display;
displaying the first user interface control; and
displaying the plurality of color bins.

16. The computer program product of claim 9, wherein a user interface control of the plurality of user interface controls comprises one or more of a hue control, a saturation control, and a luminance control.

17. A system comprising:
a processor; and
a computer-readable medium comprising instructions to cause the processor to perform operations comprising:
displaying a plurality of color bins in a user interface, each color bin representing a segment of a color spectrum, each color bin having a representative color that resides in the associated color spectrum segment, wherein each segment includes a plurality of color values, each representative color representing a color value at a location in the associated segment, and each color bin is selectable such that selecting a color bin enables varying colors in a content item corresponding to the color bin's associated segment;
displaying in the user interface, a first user interface control configured to vary colors in the content item based on the selected color bin; and
in response to input, displaying a plurality of user interface controls in the user interface, each user interface control associated with a segment of the color spectrum, each user interface control configured to vary colors in the content item corresponding to an associated color spectrum segment.

18. The system of claim 17, the operations further comprising hiding the first user interface control and the plurality of color bins from display, in response to the input.

19. The system of claim 17, the operations further comprising displaying an input object in the user interface, the input object configured to receive the input.

20. The system of claim 17, the operations further comprising displaying the content item in the user interface.

21. The system of claim 17, wherein varying color in the content item causes the content item to be displayed according to the varied color.

22. The system of claim 17, wherein the first user interface control comprises a slider including a button located at a changeable position within the slider, wherein the position of the button within the slider corresponds to a color attribute in the content item.

23. The system of claim 17, the operations further comprising, in response to receiving input:
hiding the plurality of user interface controls from display;
displaying the first user interface control; and
displaying the plurality of color bins.

24. The system of claim 17, wherein a user interface control of the plurality of user interface controls comprises one or more of a hue control, a saturation control, and a luminance control.

25. A method performed by one or more processes executing on a computer system, the method comprising:
displaying a content item in a display device according to one or more color attributes including a color from a color spectrum;
displaying a color bin in the display device, the color bin related to a segment of the color spectrum, the color bin displayed in a color corresponding to a representative color of the segment, wherein the segment includes a plurality of color values, the representative color representing a color value at a location in the segment, and selecting the color bin enables changing color of the content item based on the segment; and
in response to receiving input:
changing a hue of the representative color to a different hue, and
displaying the color bin in a different color corresponding to the different hue.

26. The method of claim 25, wherein receiving the input comprises:
detecting a selection of an input object displayed in the display device, the input object configured to facilitate changing the hue of the representative color to the different hue, wherein, when the input object is selected, positioning a cursor over a location in the content item causes a hue of the location to be displayed in the display device; and
receiving a selection of a location in the content item.

27. The method of claim 25, wherein, when the color bin is displayed in the representative color, changing the color of the content item causes more change in color in portions of the content item displayed according to the representative color in comparison to change in color in portions of the content item displayed in colors other than the representative color.

28. The method of claim 25, further comprising displaying a plurality of color bins representing a plurality of segments of the color spectrum in a plurality of colors in the display device, each color bin representing a corresponding segment of the color spectrum.

29. The method of claim 28, wherein the plurality of segments represent equal divisions of the color spectrum.

30. The method of claim 25, wherein the content item is an image displayed in the display device according to a changeable default color.

31. The method of claim 25, wherein the color bin is selected using a cursor displayed in the display device, the cursor operated by a pointing device operatively coupled to the display device.

32. A computer program product, tangibly stored on a computer-readable medium, operable to cause data processing apparatus to perform operations comprising:
displaying a content item in a display device according to one or more color attributes including a color from a color spectrum;
displaying a color bin in the display device, the color bin related to a segment of the color spectrum, the color bin displayed in a color corresponding to a representative color of the segment, wherein the segment includes a plurality of color values, the representative color representing a color value at a location in the segment, and selecting the color bin enables changing color of the content item based on the segment; and
in response to receiving input:
changing a hue of the representative color to a different hue, and
displaying the color bin in a different color corresponding to the different hue.

33. The computer program product, of claim 32, wherein receiving the input comprises:
detecting a selection of an input object displayed in the display device, the input object configured to facilitate changing the hue of the representative color to the different hue, wherein, when the input object is selected, positioning a cursor over a location in the content item causes a hue of the location to be displayed in the display device; and
receiving a selection of a location in the content item.

34. The computer program product, of claim 32, wherein, when the color bin is displayed in the representative color, changing the color of the content item causes more change in color in portions of the content item displayed according to the representative color in comparison to change in color in portions of the content item displayed in colors other than the representative color.

35. The computer program product, of claim 32, the operations further comprising displaying a plurality of color bins representing a plurality of segments of the color spectrum in a plurality of colors in the display device, each color bin representing a corresponding segment of the color spectrum.

36. The computer program product, of claim 35, wherein the plurality of segments represent equal divisions of the color spectrum.

37. The computer program product, of claim 32, wherein the content item is an image displayed in the display device according to a changeable default color.

38. The computer program product, of claim 32, wherein the color bin is selected using a cursor displayed in the display device, the cursor operated by a pointing device operatively coupled to the display device.

39. A system comprising:
a processor; and
a computer-readable medium comprising instructions to cause the processor to perform operations comprising:
displaying a content item in a display device according to one or more color attributes including a color from a color spectrum;
displaying a color bin in the display device, the color bin related to a segment of the color spectrum, the color bin displayed in a color corresponding to a representative color of the segment, wherein the segment includes a plurality of color values, the representative color representing a color value at a location in the segment, and selecting the color bin enables changing color of the content item based on the segment; and
in response to receiving input:
changing a hue of the representative color to a different hue, and displaying the color bin in a different color corresponding to the different hue.

40. The system of claim 39, wherein receiving the input comprises:

detecting a selection of an input object displayed in the display device, the input object configured to facilitate changing the hue of the representative color to the different hue, wherein, when the input object is selected, positioning a cursor over a location in the content item causes a hue of the location to be displayed in the display device; and receiving a selection of a location in the content item.

41. The system of claim 39, wherein, when the color bin is displayed in the representative color, changing the color of the content item causes more change in color in portions of the content item displayed according to the representative color in comparison to change in color in portions of the content item displayed in colors other than the representative color.

42. The system of claim 39, the operations further comprising displaying a plurality of color bins representing a plurality of segments of the color spectrum in a plurality of colors in the display device, each color bin representing a corresponding segment of the color spectrum.

43. The system of claim 42, wherein the plurality of segments represent equal divisions of the color spectrum.

44. The system of claim 39, wherein the content item is an image displayed in the display device according to a changeable default color.

45. The system of claim 39, wherein the color bin is selected using a cursor displayed in the display device, the cursor operated by a pointing device operatively coupled to the display device.

* * * * *